United States Patent Office 3,546,151
Patented Dec. 8, 1970

---

3,546,151
WATER REPELLENT CORROSION INHIBITING COMPOSITION
Hayward R. Baker, Silver Spring, Md., and Robert N. Bolster, Fairfax County, Va., assignors to the United States of America as represented by the Secretary of the Navy
No Drawing. Filed June 10, 1968, Ser. No. 735,550
Int. Cl. C08f 45/52
U.S. Cl. 260—28.5
4 Claims

ABSTRACT OF THE DISCLOSURE

Liquid compositions which are solutions in a volatile aliphatic hydrocarbon solvent of from about 35 to 40% by weight of n-butanol and a small proportion each of mixed isomers of a long chain alkylamine salt of a $C_8$ to $C_{22}$ alkyl or alkenyl succinic acid long chain alkylmonoamide, paraffin wax, an ethylene-vinylacetate copolymer having a vinylacetate component of from about 25 to 33% by weight, and, optionally, an antioxidant. The liquid compositions are useful for displacing water from and providing a dry, water repellent, corrosion-inhibiting coating on electrical insulator mountings, particularly when they are in direct association with steel parts.

---

The invention described herein may be manufactured and used by or for the Government of the United States of America for governmental purposes without the payment of any royalties thereon or therefor.

This invention relates to liquid compositions, more particularly to new liquid compositions which displace water from and are useful for providing a dry, water repellent, corrosion-inhibiting coating on electrical insulator mountings which in use are contained in steel frames or are otherwise in direct association with steel supports and which may have attached thereto, terminals, switches or other electrical or electronic components. The insulator mountings may be, for example, molded or rolled textile or paper fiber-phenolic resin composites or molded or rolled glass mat-melamine resin composites and filament-wound glass fiber-epoxy resin composites. When the insulator mountings are covered with moisture the applied liquid compositions will displace the water from the insulator surfaces before forming the coating thereon.

BACKGROUND OF THE INVENTION

The presence of surface moisture on electrical insulator mountings is known to provide an electrical leakage path between terminals. A moisture barrier on the insulator surfaces would preclude the occurrence of this electrical leakage. However, most of the anti-moisture compositions currently in use contain non-volatile, non-drying oils, surfactants and corrosion inhibitors and are not suitable for providing a moisture barrier on electrical insulator mountings. They remove water from solid surfaces by emulsification rather than by displacement. The emulsified water evaporates slowly. It also leaves behind any dissolved salts. The oily film left on the surface picks up dust from the atmosphere more readily than does a dry surface. The surfactant reduces the water repellency of the oily film and exposure to moisture condensation causes the film to emulsify and wash off. In some cases, increased wetting caused by the surfactant in the film has been observed to increase the electrical leakage, rather than decrease it.

Displacing fluids which contain an alcohol and a corrosion inhibitor are more effective in removing water from solid surfaces. However, corrosion inhibitors used in the past emulsified slightly on exposure to moisture condensation and therefore did not aid in reducing electrical leakage.

It is an object of the present invention to provide new liquid compositions which are effective to displace moisture from solid surfaces and deposit thereon a water repellent coating which is also corrosion-inhibiting.

It is a further object to provide liquid compositions of the aforesaid kind for depositing an improved water repellent, corrosion-inhibiting coating on electrical insulator mountings which are attached to or directly associated with steel frames or supports.

STATEMENT OF INVENTION

The above and other objects are accomplished in the liquid compositions of the present invention which comprise, broadly stated, a solution in a volatile aliphatic hydrocarbon solvent of a waxy, polar corrosion inhibitor, paraffin wax, a polymer-wax modifier, and n-butanol, the latter as the water displacing agent.

The waxy, polar corrosion inhibitors for the liquid compositions of the invention are mixed isomers of alkylamine salts of alkyl and alkenylsuccinic acid alkylmonoamides which are hereinafter more fully defined. These mixed isomers are hard waxy materials and have the formulas:

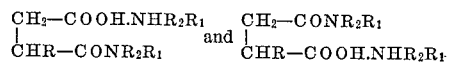

wherein R is a normal or branched chain alkyl or alkenyl radical having from 8 to 22 carbon atoms, $R_1$ is an alkyl radical having a straight chain of from 18 to 22 carbon atoms and $R_2$ is hydrogen or an alkyl radical having a straight chain of from 18 to 22 carbon atoms. R may be, for example, octyl, decyl, dodecyl, tetradecyl, hexadecyl, heptadecyl, octadecyl, 2-ethylhexyl, isostearyl, etc.; octenyl, decenyl, dodecenyl, tetradecenyl, hexadecenyl, heptadecenyl, octadecenyl, eicosenyl, docosenyl, tetrapropenyl, etc. The alkyl radicals $R_1$ and $R_2$ may be, for example, octadecyl, arachidyl, behenyl, etc. The amount of the mixed isomers used in the compositions may range from about 0.5 to 1.0% by weight thereof.

Among the mixed isomers which may be used as the polar corrosion inhibitor in the liquid compositions of the invention are, for example, the isomeric arachidylamine salts of 2-ethylhexyl-succinic acid arachidyl monoamides, the isomeric behenylamine salts of 2-ethylhexyl-succinic acid behenyl monoamides, the isomeric arachidylamine salts of dodecylsuccinic acid arachidyl monoamides, the isomeric arachidylamine salts of hexadecylsuccinic acid arachidyl monoamides, the isomeric octadecylamine salts of octadecylsuccinic acid octadecyl monoamides, the isomeric behenylamine salts of octadecylsuccinic acid behenyl monoamides, the isomeric octadecylamine salts of octenylsuccinic acid octadecyl monoamides, the isomeric octadecylamine salts of tetrapropenylsuccinic acid octadecyl monoamides, the isomeric arachidylamine salts of tetrapropenylsuccinic acid arachidyl monoamides, the isomeric behenylamine salts of tetrapropenylsuccinic acid behenyl monoamides, the isomeric arachidylamine salts of hexadecenylsuccinic acid arachidyl monoamides and the isomeric behenylamine salts of tetrapropenylsuccinic acid behenyl monoamides, etc.

The paraffin wax for the liquid compositions may be a refined paraffin wax of 124–127° F. average melting point and is used in proportions of from about 2.5 to 4% by weight of the compositions.

The polymer modifier for the paraffin wax is an ethylenevinylacetate copolymer in which the vinylacetate component is from about 25 to 33% by weight and preferably is about 29% by weight. These copolymers are compatible with paraffin wax and are used in the liquid compositions to provide coatings having good cohesion and resistance to penetration of moisture to the substrate insulator surface. They are used in minor proportion in respect to the paraffin wax, from about 15 to 30% by weight of the copolymer to from about 85 to 70% by weight of the paraffin wax, with a preferred proportion being from about 27% by weight of the copolymer to about 73% by weight of the paraffin wax. The combined weight of the copolymer and paraffin wax in the liquid compositions may range from about 4 to 5.5% by weight thereof and in preferred liquid compositions of the invention is about 4.5% by weight thereof.

The presence of an oxidation inhibitor in the new liquid compositions is optional, but preferable where the compositions are to be stored for long periods of time. The oxidation inhibitor is used in small amounts, from about 0.02–0.1% by weight of the compositions, and suitably is a hindered phenol such as 2,6-di(tertiarybutyl) p-cresol and 2,4-dimethyl-6-tertiarybutyl phenol.

The liquid compositions of the invention are prepared by dissolving the solid components, namely, the mixed isomers, the paraffin wax, the copolymer, and where used, the oxidation inhibitor, also, in a liquid aliphatic hydrocarbon which boils in the temperature range of from about 300–400° F., for example, Stoddard 100 Solvent, #1 Varsol and Amsco 104 Solvent. Solution of the solid components in the aliphatic hydrocarbon solvent is accomplished by heating the mixture under reflux. This solution is cooled to room temperature and the n-butanol mixed therewith to form the liquid composition.

The new liquid compositions contain from about 0.5 to 1% by weight of the mixed isomers as hereinabove defined, from about 2.5 to 4% by weight of paraffin wax, from about 0.5 to 1.5% by weight of the ethylenevinylacetate copolymer, from about 0.02 to 0.1% by weight of the oxidation inhibitor when present, and from about 35 to 40% by weight of n-butanol in solution in the aliphatic hydrocarbon solvent which is present in major proportion and may be from about 45 to 60% by weight of the liquid compositions. The combined weight of the dissolved solid components in the liquid compositions may be from about 5 to 6% thereof, including or not the oxidation inhibitor.

The liquid coating compositions are applied by spraying to the surfaces to be coated, for example, to a molded fiber-resin composite insulator tube or panel, which may or may not have mounted thereon, terminals, switches and other electrical or electronic components. Spraying is continued until all of the surface to be coated is covered and any visible moisture is displaced therefrom. Removal of water from the surface is effected by the displacing action of the n-butanol in the composition which causes the water to run off the surface rather than emulsifying with it. The coating may be allowed to dry. Preferably the wet coating is warmed, for example, to about 120° F., to accelerate evaporation of the solvents (butanol and liquid aliphatic hydrocarbon). A second coating may be applied in the same manner for more complete protection of the surface.

The coating remaining on the treated insulator surface after evaporation of the solvents is dry, not tacky, and has a much lower propensity for collecting dust and dirt then oily coatings. It is soft enough, however, to allow moving parts to operate freely and connectors and switches will maintain low-resistance electrical contact.

The solid coating on the insulator surface is water repellent and a blend of the paraffin wax and the ethylenevinylacetate copolymer in which the mixed isomers are dispersed. It has a low energy surface and contains no water-soluble or emulsifiable materials. Consequently, water will not form a continuous film on the coated insulator surfaces and no ions are contributed to the moisture from the coating. The mixed isomers are effective as corrosion inhibitors and are water repellent and emulsification resistant.

On exposure to moisture condensation of an electrical insulator mount, for example, one formed of a cured cloth-phenolic resin or paper fiber-resin composite, which has been coated with a solid dry film as described above, the low surface energy of the coating will cause the condensed moisture to pull up into drops rather than form a continuous film. The noncontinuous form of the water on the surface of the insulator presents a broken path for electrical leakage and thereby a high level of surface resistivity between conductive points is maintained for the insulator. The coating also reduces entrance of moisture into permeable substrates such as cured cloth or paper fiber-phenolic resin composites and protects metal surfaces on the panel against corrosion.

PREPARATION OF THE MIXED ISOMERS

The mixed isomers are prepared from an alkyl or alkenyl succinic anhydride of the formula:

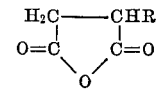

wherein R is an alkyl or alkenyl radical as defined above, and a primary or secondary alkylamine of the formula:

wherein $R_1$ is an alkyl radical as defined above and $R_2$ is hydrogen or an alkyl radical as defined above.

The alkyl or alkenylsuccinic anhydride and the alkylamine are brought together in equivalent reacting proportions, i.e., in 1:2 mole ratio, in a suitable volatile solvent, for example, in ethanol or isopropanol, which may be dry or contain small amounts of water up to about 3% by weight, and the reactant mixture heated to a temperature of about 50° C., under stirring until it forms a solution. As soon as solution occurs, the reaction forming the mixed isomers takes place. The product mixed isomers are isolated from the reaction solution by evaporation of the solvent and, if present, of the water also. Removal of the solvent and of water, if also present, is accomplished by continued gradual heating of the solution to about 110° C. with formation of a melt of the product mixed isomers. When a mixture of the alkylamines is used for preparation of the mixed isomers, a random occurrence of the alkyl radicals in the alkylamine salt and alkylamido portions of the molecule of the mixed isomers takes place.

The preparation of the mixed isomers is illustrated by the following specific example. While a mixture of the alkylamines was used, the preparation is the same for making the mixed isomers of the individual alkylamines.

EXAMPLE

To 100 ml. of isopropanol was added 2 ml. of water, 3.32 grams of tetrapropenylsuccinic anhydride and 8 grams of commercial mixed amines (Kemamine P-190) composed of about 90% by weight of mixed arachidyl and behenyl amines and about 10% by weight of stearylamine. The weight ratio of the arachidyl to the behenyl amine was about 40% to 60%, respectively. This mixture was gradually heated to 100° C., with interim formation of a solution and ultimate evaporation of all the isopropanol and water to isolate the formed mixed isomers as a molten product. On cooling to room temperature, the mixed isomers had a hard waxy consistency. They are an isomeric mixture of $C_{18}$, $C_{20}$ and $C_{22}$ alkylamine salts of tetrapropenylsuccinic acid $C_{18}$, $C_{20}$ and $C_{22}$ alkyl monoamides in which the $C_{20}$ and $C_{22}$ alkyl groups are dominant.

A preferred liquid composition of the invention was prepared by adding 0.8 gram of the mixer isomers obtained by the procedure of the above example, 3.3 grams of refined paraffin wax of 124 to 127° F. average melting point, 1.2 grams of ethylene-vinylacetate copolymer containing 71% of by weight ethylene and 29% by weight vinylacetate (Elvax 250), and 0.03 gram of 2,6-di(tertiarybutyl) p-cresol to 54.67 grams of a liquid aliphatic hydrocarbon having a boiling range of 320–390° F. (#1 Varsol) and heating the mixture under reflux to form a solution. This solution was cooled to room temperature and 40 grams of n-butanol were added and mixed therewith to form the liquid composition.

The efficacy of the liquid compositions to provide coatings which protect against rusting of steel surfaces and maintain a high level of electrical resistivity across insulator surfaces under moisture condensation is demonstrated by the results of the following tests.

CORROSION TEST

A pair of steel panels, 3" x 6", were given a single, overall coating by spraying them with the preferred liquid composition, described above, and drying the coating at room temperature.

One of the coated panels was immersed in synthetic sea water for 16 hours. The other coated panel was immersed in fresh (tap) water for 23 days. Visual inspection of the coated panels after the water exposure showed a few rust spots at the edges of the panel which had been immersed in the synthetic sea water and no rust on the panel which had been immersed in the fresh water.

SURFACE ELECTRICAL CONDUCTIVITY DETERMINATION

The surface electrical conductivity of coated and uncoated insulator surfaces in the presence of moisture condensation was determined for insulator materials made of a cured composite of:

(A) rolled cotton fabric-phenol formaldehyde resin,
(B) molded cellulose paper fiber-phenol formaldehyde resin,
(C) rolled glass mat-melamine formaldehyde resin, and
(D) filament wound glass fiber-epoxy resin.

The insulator materials were in the form of tubes of ½ inch outer diameter and ⅜ inch inner diameter. They were cleaned to remove ionic residues and oily material by washing with water or a volatile organic solvent before conducting the determination of the surface electrical conductivity and coating. The cleaned tubes were stored in a desiccator jar without desiccant.

Coating of the tubes of the insulator materials was on the outer surface. Two coats were provided and with the use of the preferred liquid composition described above. The coating was performed by spraying the surface and allowing the coat to dry at room temperature. The second coat was applied over the first coat in the same manner.

In the procedure for determining the surface resistivity, the tube of insulator material was equipped with a pair of nickel band electrodes, spaced 1 inch apart, and slipped over a length of brass tubing. This assembly was placed in a constant humidity cabinet. Leads from the electrodes were brought through the humidity cabinet to connect the electrodes in series with an exteriorly located electrometer and a battery source which provided a constant potential of 100 volts. Flexible tubing attached to each end of the brass tubing was brought through the humidity cabinet and connected to a source of cold water.

The atmosphere in the humidity cabinet was maintained at 26° C. and 90% humidity. Moisture condensation on the insulator tube was induced by circulating cold water at 20° C. through the brass tubing from the cold water source to lower the temperature of the insulator tube below the dew point. The tube of insulator material was held under these conditions for three hours. Measurement of the current flowing across the surface of the insulator tube between the electrodes was made when the current had reached a steady state which was after about 2½ hours of exposure to moisture condensation.

The brass tubing, on which the insulator tube was mounted, was connected in the circuit to serve as a guard electrode whereby the current values measured were limited to those for the outside surface of the insulator tube and were not for the volume of the insulator tube.

The electrical surface resistivity of the insulator materials determined in the above manner is given in Table I below:

TABLE I

| Insulator material | Uncoated, ohms | Coated, ohms |
| --- | --- | --- |
| A | $8 \times 10^7$ | $7 \times 10^{13}$ |
| B | $3 \times 10^7$ | $4 \times 10^{13}$ |
| C | $5.5 \times 10^7$ | $4 \times 10^{10}$ |
| D | $2.5 \times 10^8$ | $6 \times 10^{15}$ |

The surface resistivity of the insulator materials was also determined under conditions in which the tube of the insulator material was (1) dry (exposed to the room air),
(2) the outer surface wet with distilled water, and
(3) the water wet outer surface sprayed with the preferred liquid composition described above and the current measured
 (a) two minutes after spraying, and
 (b) 10 minutes after spraying.

Measurement of the current flowing across the surface of the tubes between the electrodes was made with the tubes mounted on the length of brass tubing connected in the circuit as a guard electrode and exposed to the room air. The electrical surface resistivity of the insulator materials determined under these conditions is given in Table II below:

TABLE II

| Insulator material | Dry, ohms | Wet, ohms | 2 minutes after spraying, ohms | 10 minutes after spraying, ohms |
| --- | --- | --- | --- | --- |
| A | $6 \times 10^{13}$ | $3 \times 10^7$ | $1.4 \times 10^{10}$ | $1.9 \times 10^{12}$ |
| B | $8.2 \times 10^{10}$ | $1.8 \times 10^7$ | $3.1 \times 10^{10}$ | $7.6 \times 10^{10}$ |
| C | $8 \times 10^{14}$ | $5 \times 10^6$ | $3 \times 10^9$ | $6.3 \times 10^{11}$ |
| D | $1 \times 10^{16}$ | $8 \times 10^9$ | $4.4 \times 10^{10}$ | $7.6 \times 10^{13}$ |

Since the invention described herein may be variously practiced without departing from the spirit or scope thereof, it is intended that specific embodiments appearing in the above description shall be taken by way of illustration and not in limitation except as may be defined in the appended claims.

What is claimed and desired to be secured by Letters Patent of the United States is:

1. A liquid composition comprising a major proportion of a liquid aliphatic hydrocarbon which boils in the range of from about 300–400° F. containing in solution from about 2.5 to 4% by weight of paraffin wax, from about 0.5 to 1% by weight of an ethylene-vinylacetate copolymer containing from about 25 to 33% by weight of vinylacetate, from about 0.5 to 1% by weight of the mixed isomers of an alkylamine salt of a hydrocarbon substituted succinic acid alkylmonoamide of the formulas:

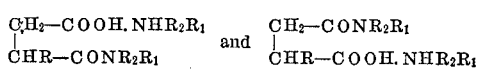

wherein R is a member of the group consisting of alkyl and alkenyl radicals having from 8 to 22 carbon atoms, $R_1$ is a member of the group consisting of straight chain alkyl radicals having from 18 to 22 carbon atoms and $R_2$ is a member of the group consisting of hydrogen and straight chain alkyl radicals having from 18 to 22 carbon atoms, and from about 35 to 45% by weight of n-butanol.

2. A liquid composition as defined in claim 1, wherein R is the tetradecenyl radical.

3. A liquid composition as defined in claim 1, wherein the mixed isomers are of the behenylamine salt of tetradecenyl succinic acid behenylmonoamide.

4. A liquid composition as defined in claim 1, wherein the mixed isomers are of $C_{18}$, $C_{20}$ and $C_{22}$ alkylamine salts of tetradecenyl succinic acid $C_{18}$, $C_{20}$ and $C_{22}$ alkylmonoamides in which said $C_{20}$ and $C_{22}$ alkylamine salts together are in preponderant amount.

No references cited.

MORRIS LIEBMAN, Primary Examiner

P. R. MICHL, Assistant Examiner

U.S. Cl. X.R.

260—33.4, 33.6